United States Patent
Ucar et al.

(10) Patent No.: US 7,647,558 B2
(45) Date of Patent: Jan. 12, 2010

(54) USER INTERFACE FOR PRESENTING OBJECT REPRESENTATIONS

(75) Inventors: Sultan Ucar, Rauenberg (DE); Ingo Deck, Mannheim (DE); Carmen Oestringer, Mannheim (DE); Barbara Jochum, Muehlhausen (DE); Volker Mueller, Karlsruhe (DE); Bernhard Drittler, Walldorf (DE); Roman Hayer, Saarbruecken (DE); Markus Fritz, Saarbruecken (DE); Martin Dauer, Alsting (FR)

(73) Assignee: SAP AG, Walldorf (DE)

( * ) Notice: Subject to any disclaimer, the term of this patent is extended or adjusted under 35 U.S.C. 154(b) by 345 days.

(21) Appl. No.: 11/246,924

(22) Filed: Oct. 7, 2005

(65) Prior Publication Data

US 2006/0080304 A1 Apr. 13, 2006

Related U.S. Application Data

(60) Provisional application No. 60/617,421, filed on Oct. 8, 2004.

(51) Int. Cl.
*G06F 3/048* (2006.01)
(52) U.S. Cl. ........................... 715/746; 715/273
(58) Field of Classification Search .................. 715/700, 715/705, 763–767, 778, 967, 273, 746; 707/102; 345/764, 340, 356, 420; 709/107, 100
See application file for complete search history.

(56) References Cited

U.S. PATENT DOCUMENTS 5,748,931 A * 5/1998 Jones et al. .................. 715/853
5,926,177 A * 7/1999 Hatanaka et al. ............ 715/747
5,991,780 A * 11/1999 Rivette et al. ............... 715/255
6,028,602 A * 2/2000 Weidenfeller et al. ....... 715/781
6,044,394 A * 3/2000 Cadden et al. .............. 718/107
6,104,395 A * 8/2000 Alimpich et al. ............ 715/781
2002/0143800 A1 * 10/2002 Lindberg et al. ............ 707/201
2002/0154166 A1 * 10/2002 Sanders et al. .............. 345/764
2003/0229646 A1 12/2003 Bach et al.

OTHER PUBLICATIONS

"Microsoft Office Outlook 2003 Bible" by Rob Tidrow et al., Copyright 2004, Chapters 5-7, 74 pages.

* cited by examiner

*Primary Examiner*—Boris Pesin
*Assistant Examiner*—Shen Shiau
(74) *Attorney, Agent, or Firm*—Fish & Richardson P.C.

(57) ABSTRACT

A graphical user interface (GUI) for presenting representations of selected objects in a computer system. The GUI presents an object selected from a collection of objects using a selected visual representation selected from at least first and second visual representations to be initiated using different initiation techniques. A first input control causes the selected object to be presented using another visual representation instead of the selected visual representation. A second input control causes another object to be presented instead of the selected object using any visual configuration that is currently used in presenting the selected object. The first and second input controls may be located in an object header area that remains essentially unchanged when changing between the at least first and second visual representations.

15 Claims, 7 Drawing Sheets

USER INTERFACE FOR PRESENTING OBJECT REPRESENTATIONS

CROSS-REFERENCE TO RELATED APPLICATION

This application claims priority from U.S. Provisional Application No. 60/617,421, filed Oct. 8, 2004 and entitled "Sales Manager," the entire contents of which are incorporated herein by reference.

TECHNICAL FIELD

The description relates to presenting representations of selected objects.

BACKGROUND

Many computer systems have a graphical user interface (GUI) that lets a user view and manipulate one or more objects. The objects are stored in a repository and can be selectively retrieved under guidance of the GUI, for example using a search function. The search may result in a list of objects that meet the search criteria, and the GUI may provide different ways for the user to inspect or edit the individual objects. With large repositories a large number of objects may be available to the user, and it becomes important to properly identify the specific object that is involved in any particular operation. Also, some objects include a large amount of data or may otherwise be complex or voluminous, and it is important to present object data this is relevant and useful for the particular situation.

SUMMARY

The invention relates to presenting object representations.

In a first general aspect, the invention comprises a computer program product tangibly embodied in an information carrier, the computer program product comprising instructions that, when executed, generate on a display device a graphical user interface (GUI) for presenting representations of selected objects in a computer system. The GUI comprises an object presentation area presenting an object selected from a collection of objects. The selected object is presented using a selected visual representation selected from at least first and second visual representations. The first and second visual representations are initiated using different initiation techniques in the computer system. The GUI comprises a first input control for causing the object presentation area to present the selected object using another visual representation instead of the selected visual representation. The other visual representation is selected from the at least first and second visual representations. The GUI comprises a second input control for causing the object presentation area to present another object selected from the collection of objects instead of the selected object. The other object will be presented using any visual configuration that is currently used in presenting the selected object.

In selected embodiments, the first and second input controls are located in an object header area that is displayed in the GUI in association with the object presentation area when any of the collection of objects is presented, and the object header area remains essentially unchanged when changing between the at least first and second visual representations. Upon a user activating the first input control to instead have the selected object presented using the other visual representation, an identity of the selected object may be provided to the other visual representation. Upon a user activating the second input control to instead have the other object presented in the GUI, an identity of the other object may be provided to the visual configuration that is currently used in presenting the selected object. Upon a user activating the second input control, there may be generated in the computer system a) a first event for initiating the first visual representation to present the other object, and b) a second event for initiating the second visual representation to present the other object, and one of the first and second events may automatically be ignored depending on the visual configuration that is currently used in presenting the selected object. The first visual representation may be generated using a table-based process in a backend of the computer system, the table-based process including a controller that is configured to generate the first visual representation. The second visual representation may be script-based and generated by remotely calling a backend of the computer system. The second visual representation may include information obtained from a data warehouse system, wherein the data warehouse system obtained the information from the backend. The computer system may comprise an application program configured for managing the collection of objects, and the application program may specify at least the first visual representation to be available for the collection of objects. The first visual representation may allow editing of any of the collection of objects and the second visual representation may not allow editing of any of the collection of objects. The collection of objects may comprise a list resulting from a search performed in the computer system, and a user may individually select any of the collection of objects for manipulation. The GUI may further comprise a selection control displayed in association with the first and second input controls, the selection control indicating whether a currently presented object is currently selected.

In a second general aspect, the invention comprises a computer system including a collection of objects, wherein any object selected from the collection of objects can be presented using a selected visual representation selected from at least first and second visual representations. The first and second visual representations are initiated using different initiation techniques in the computer system. The computer system includes a graphical user interface (GUI) comprising a first input control for causing the GUI to present the selected object using another visual representation instead of the selected visual representation. The other visual representation is selected from the at least first and second visual representations. The GUI comprises a second input control for causing the GUI to present another object selected from the collection of objects instead of the selected object. The other object will be presented using any visual configuration that is currently used in presenting the selected object.

In selected embodiments, the first visual representation is generated using a table-based process in a backend of the computer system, the table-based process including a controller that is configured to generate the first visual representation. The second visual representation may be script-based and generated by remotely calling a backend of the computer system. The second visual representation may include information obtained from a data warehouse system, wherein the data warehouse system obtained the information from the backend. The computer system may comprise an application program configured for managing the collection of objects, and the application program may specify at least the first visual representation to be available for the collection of objects.

In a third general aspect, the invention comprises a method of presenting representations of selected objects in a computer system. The method comprises presenting an object selected from a collection of objects, the selected object being presented using a selected visual representation selected from at least first and second visual representations. The first and second visual representations are initiated using different initiation techniques in the computer system. The method comprises presenting, if a first input is received, the selected object using another visual representation instead of the selected visual representation. The other visual representation is selected from the at least first and second visual representations. The method comprises presenting, if a second input is received, another object selected from the collection of objects instead of the selected object. The other object will be presented using any visual configuration that is currently used in presenting the selected object.

The details of one or more embodiments of the invention are set forth in the accompanying drawings and the description below. Other features, objects, and advantages of the invention will be apparent from the description and drawings, and from the claims.

BRIEF DESCRIPTION OF THE DRAWINGS

Like reference numerals in the various drawings indicate like elements.

DETAILED DESCRIPTION

Figure 1:
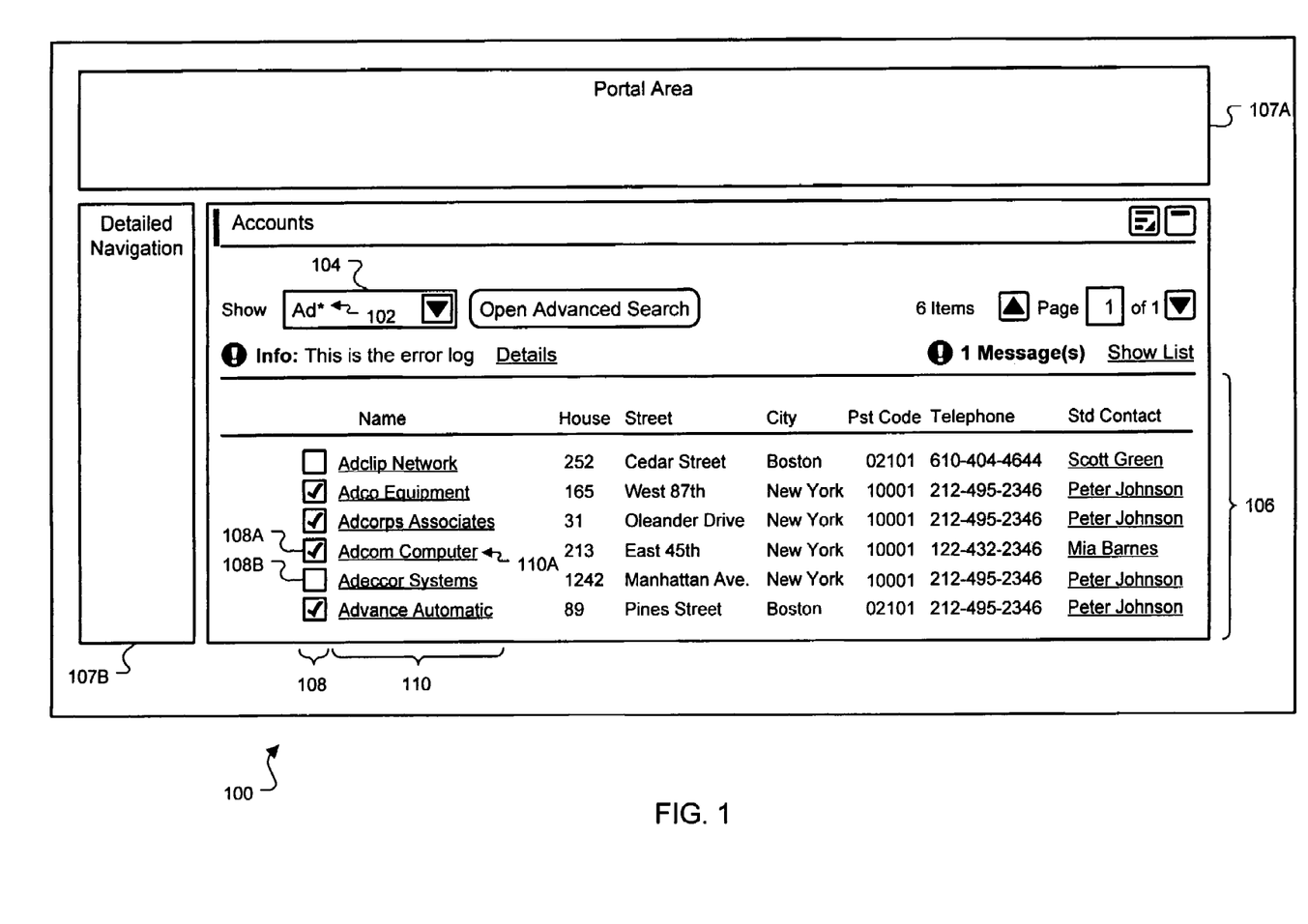
FIG. 1 shows a graphical user interface (GUI) for presenting a list with representations of objects.

FIG. 1 shows a graphical user interface (GUI) 100 in a system that can present any of several visual representations of an object. The object may be selected from a collection of objects obtained in a search. In FIG. 1, a user can initiate a search by making a search input 102 such as "Ad*" in a search input control 104. The "*" symbol is a wildcard character. Upon performing the search, the system may present a list 106 of objects in the GUI 100 matching the search input 102. The GUI 100 further includes a portal area 107A and a detailed-navigation area 107B that provide other functions. The input control 104 may include a dropdown box for the user to choose between predefined saved searches (e.g., "Favorite objects" or "All objects of year 2005" etc.) An "Open Advanced Search" button opens another area where the user can enter more search criteria. In other implementations, the input control 104 is located in a different view than the search results.

The GUI 100 may include one or more selection controls 108 that allow the user to individually select objects in the list 106 for manipulation. For example, selected objects may be grouped together to allow the user to make a single input to edit a field contained in all of the objects in the group, sometimes referred to as a "mass assignment." The user has here selected four of the objects using the control 108. The selected group includes an object named "Adcom Computer" that is associated with a currently active selection control 108A. In contrast, another object named "Adeccor Systems" has not been selected by the user, as indicated by its currently inactive selection control 108B.

When the user selects an object name from a column 110 of name fields in the list 106, this may cause the system to display a visual representation for the individual object. For example, this function lets the user open a more detailed visual representation of any of the objects for a closer review or more specific editing. Here, the user selects an object having the name "Adcom Computer" by clicking on a name field 110A in the column 110.

Figure 2:
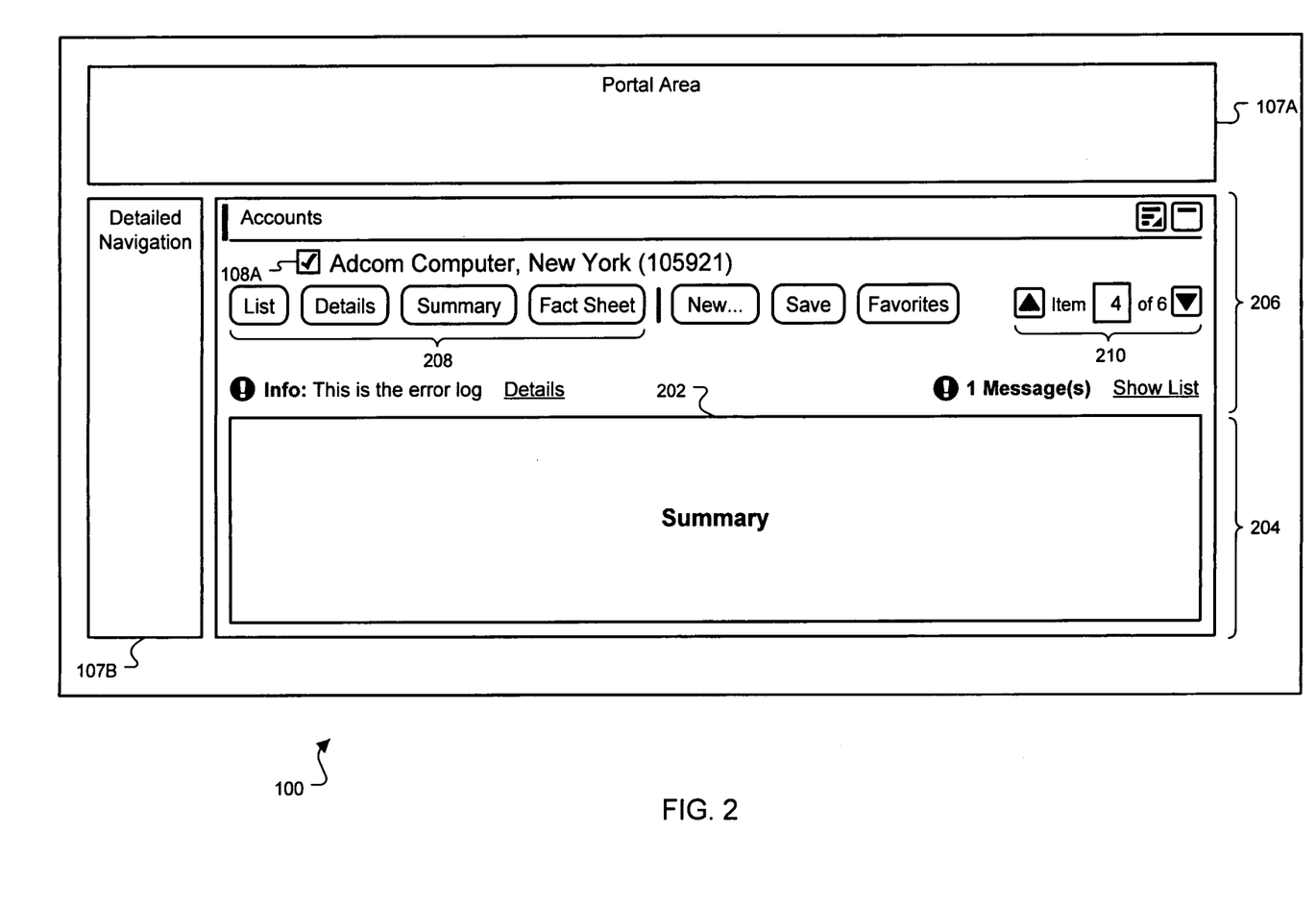
FIG. 2 shows an object from the list in FIG. 1 being presented using a first visual representation.

In FIG. 2, the GUI 100 now shows a first visual representation of the "Adcom Computer" object. Here, the first visual representation is a Summary 202 associated with the object that the user selected. The Summary 202 of the object is presented in an object presentation area 204 of the GUI 100. In one implementation, the Summary 202 is a read-only visual representation in which the user cannot edit the data. That is, the Summary 202 is used for presenting a selected portion or subset of the object data to give the user an overview of what the object is and the data that it contains.

The GUI 100 may display an object header area 206 in association with the object presentation area 204. The object header area 206 may include key information about the current object, such as the information "Adcom Computer, New York (105921)" that is currently presented there. The object header area 206 includes a first input control 208 where a user may select another visual representation of the current object for display in the object presentation area 204. In some implementations, the input control 208 is a single button, also referred to as a popup trigger, with which a user can choose any of several views. That is, upon the user pressing the popup trigger there appears a menu listing the different views that the user can select.

The object header area 206 includes a second input control 210 for the user to instead view another one of the objects in the list 106. Upon the user activating the input control 210, the other object is presented using the current visual representation. The second input control 210 may let the user "step" upward or downward among the objects in the list to view any of them in the same visual representation as for the current object. The input control 108A in the object header area 206 indicates for each object whether it is currently selected and allows the user to change that setting while viewing the particular visual representation of the object.

The individual visual representations in the object presentation area 204 may be generated using different techniques. For example, the Summary 202 may be based on a script language, such as JavaScript, and may be generated by a report generating program in a data warehouse system. Another visual representation may include transactional data that is retrieved from a backend system. The object header area 206 may be used with any of the visual representations and may remain essentially unchanged-for example with regard to the presented key information-when switching between them.

Figure 3:
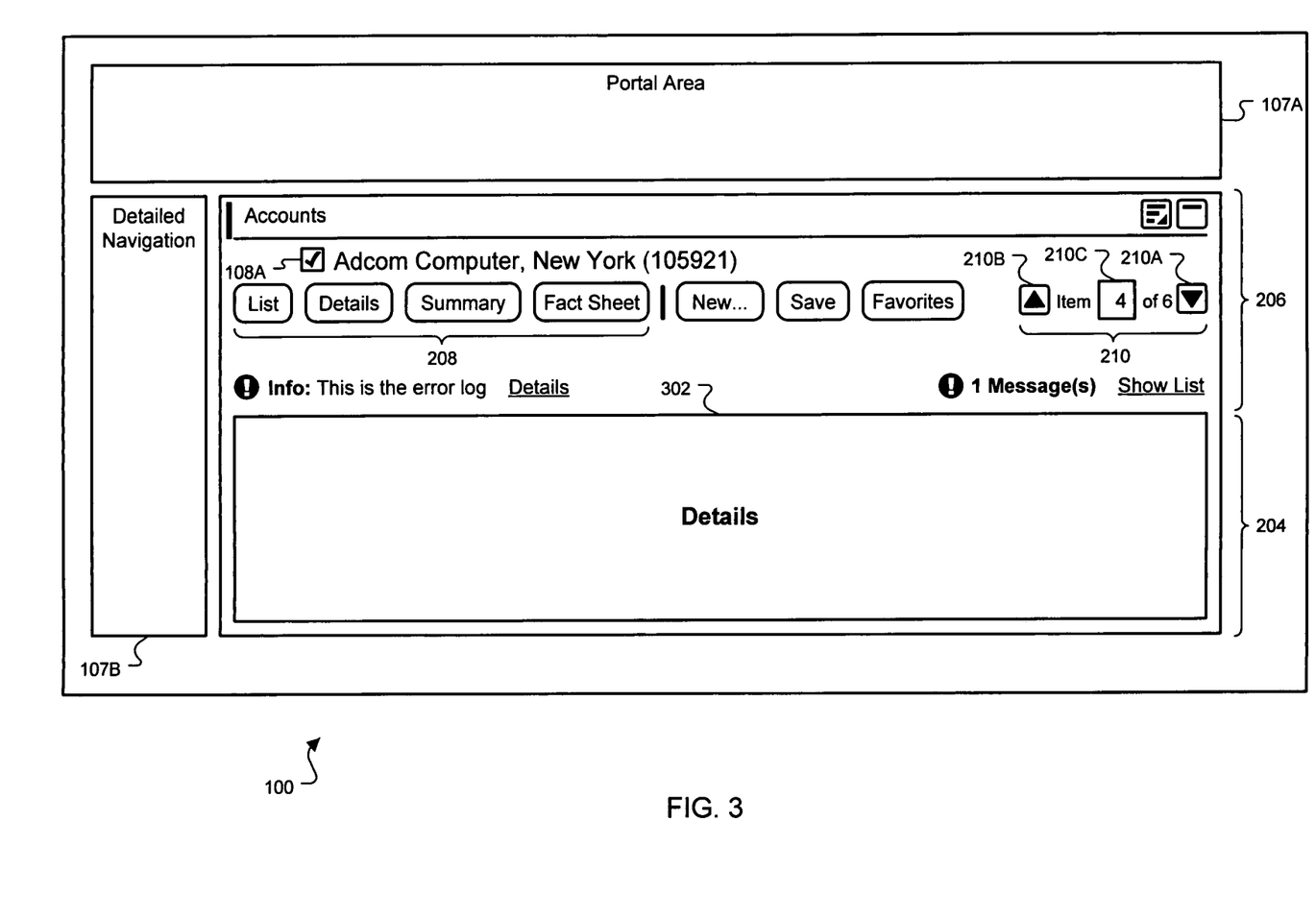
FIG. 3 shows the object of FIG. 2 being presented using a second visual representation.

In FIG. 3, the user has selected the "Details" button of the first input control 208 while the "Adcom Computer" object was being presented using the "Summary" visual representation. The GUI 100 now shows a second visual representation of the "Adcom Computer" object corresponding to a "Detail" view. Here, the second visual representation displays Details 302 of the current object in the object presentation area 204. In one implementation, the Details 302 visual representation includes transactional data and allows editing of the "Adcom Computer" object, or any other of the collection of objects that it is being used to present.

The object header area 206 of FIG. 3 is essentially unchanged from that of FIG. 2. The object header area 206 of FIG. 3 still includes the key information, the input control 208, the input control 210, and the selection control 108A. The selection control 108A continues to indicate that the "Adcom Computer" object is included in the selected group of objects. The user may manipulate the "Adcom Computer" object together with other selected objects, such as in a "mass assignment."

The user may make an input in the input control 210, such as by selecting a down arrow button 210A. Selecting the down arrow button 210A causes the next object in the list 106 to be displayed using the current Details 302 visual representation. The input control 210 may have other control elements, such as a button 210B to access the previous object in the list or a text entry field 210C allowing the user to enter the number of a specific object in the list. Here, the user selects the down arrow button 210A to view the next object in the list.

Figure 4:
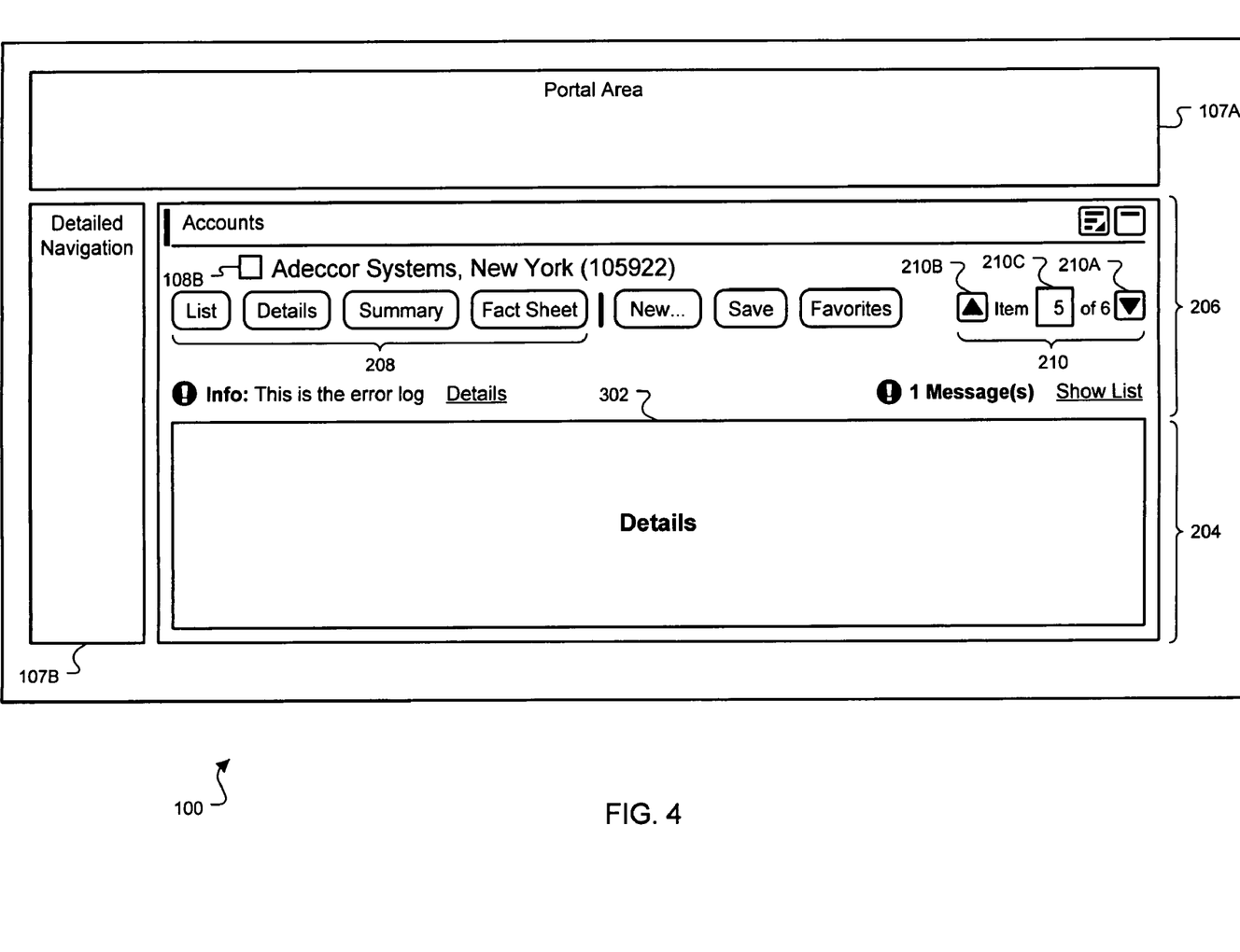
FIG. 4 shows a second object being presented using the visual representation of FIG. 3.

In FIG. 4, the next object in the list 106, which has the name "Adeccor Systems," is now displayed using the same Details 302 visual representation of FIG. 3. The details of any two objects may differ to a greater or lesser extent, so although the "Adeccor Systems" object is currently displayed using the same visual representation as was previously used for the "Adcom Computer" object, the contents of the respective visual representations are likely different.

As indicated by the input control 108B, the "Adeccor Systems" object is not currently selected in the list 106. Accordingly, the "Adeccor Systems" object would not be included in a group manipulation of selected objects, such as a "mass assignment." Nevertheless, the user can access it and make revisions, to the extent the Details 302 visual representation provides an editing function.

Figure 5:
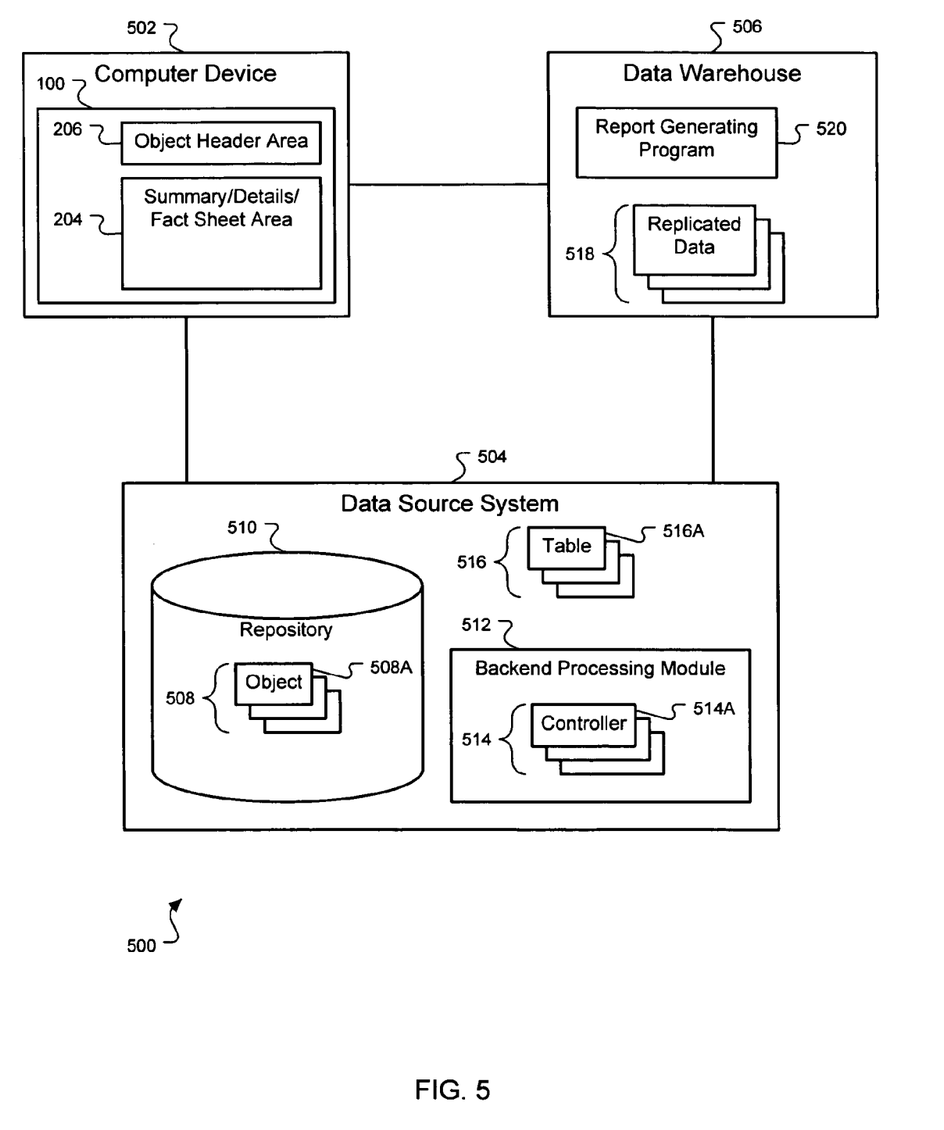
FIG. 5 is a block diagram of a system for presenting visual representations of selected objects in a GUI.

FIG. 5 shows a system 500 that may generate the GUI 100 described above. The system 500 includes a computer device 502 that presents the GUI 100 to the user. The GUI 100 contains the object header area 206 and the object presentation area, referred to here as a Summary/Details/Fact Sheet area 204. The computer device 502 is capable of communicating with a data source system 504, or backend system, and a data warehouse 506. Objects 508 that can be displayed in the list 106 are stored in a repository 510 in the data source system 504. The objects 508 in the repository 510 here represent transactional data, such as a name of an account or a product purchased using an account.

In some implementations, visual representations of transactional data are generated by a table-based process. A backend processing module 512 manages the objects 508 and is configured according to the Model-View-Controller paradigm. That is, the module 512 uses controllers (and optionally sub-controllers) to generate views for display to the user, the views containing information that the controller obtains from, or provides to, a model in the backend. Here, the backend processing module 512 includes controllers 514 for accessing tables 516 containing information about the visual representations. Particularly, the tables 516 may contain information about screen positions for views generated by respective sub-controllers, definitions of data that can be exchanged with the model, definitions of data fields or input controls to appear in views, or definitions of search functions. For example, a controller 514A may access a table 516A to generate the Details 302 visual representation of FIG. 4 showing an Adeccor Systems object 508A.

The data warehouse 506 contains replicated data 518 from the repository 510. Using the replicated data 518, a report generating program 520 generates analytical reports that can be presented to the user, such as in the Summary 202 visual representation. The report generating program 520 may be based on a script language, such as JavaScript. Accordingly, the program 520 can generate a script-based visual representation containing analytical data.

In one implementation, an identity of an object in a current visual representation is provided to another visual representation when the user makes a selection in the input control 208. Further, an identity of another object is provided to the current visual representation when the user makes a selection in the input control 210. In another implementation, the identity of the object is provided to the current visual representation and another visual representation and one is ignored based on the user selection in either the input control 208 or the input control 210.

Figure 6:
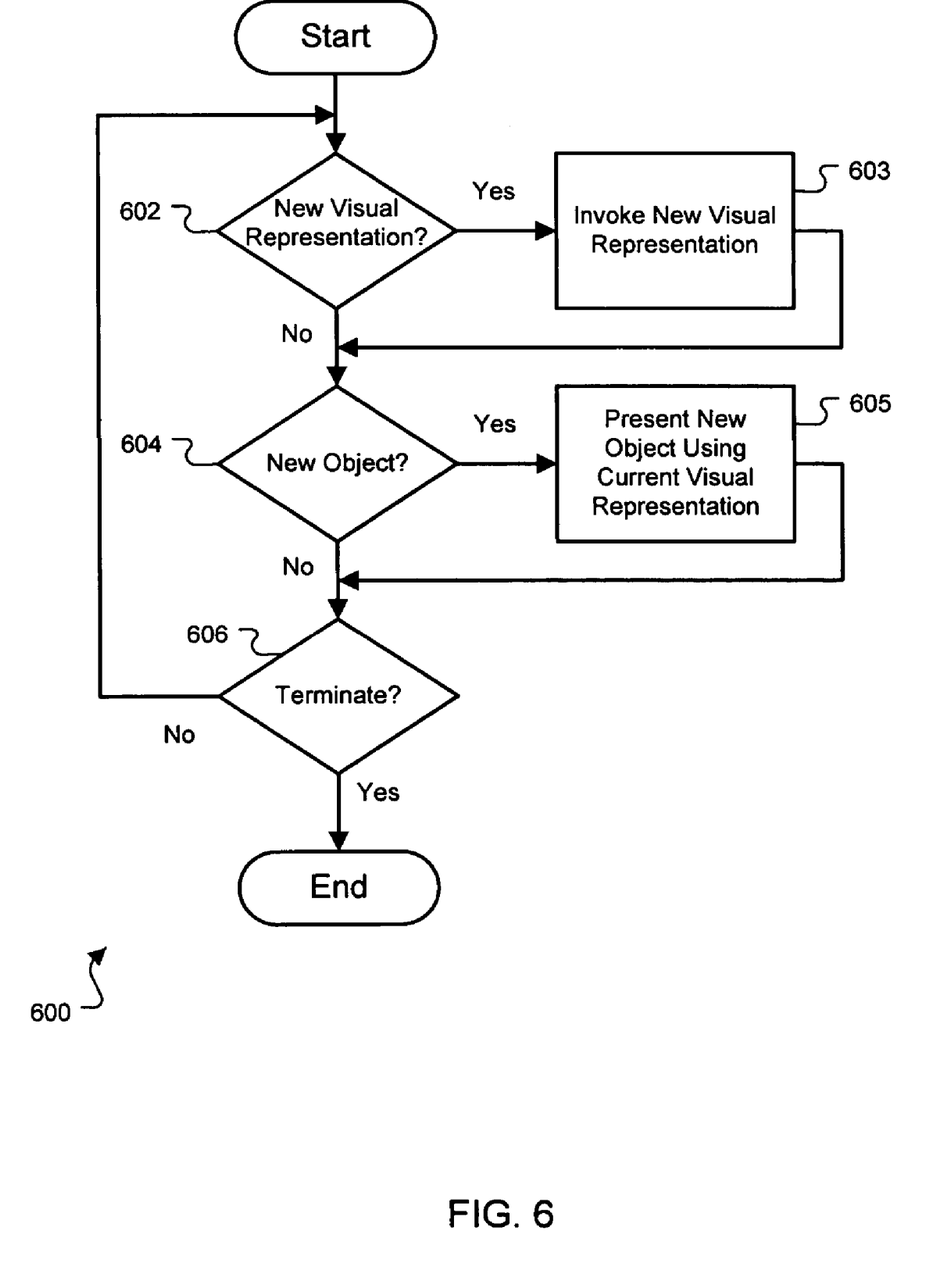
FIG. 6 is a flow chart of exemplary operations that a system may perform when presenting visual representations of selected objects in a GUI.

FIG. 6 is a flow chart of exemplary operations 600 relating to presenting object representations. For example, the operations 600 can be performed in the system 500. A processor executing instructions stored in a computer program product can perform the operations 600. The operations 600 begin in step 602 with a decision of whether to invoke a new visual representation. If a user makes an input selecting a new visual representation to be displayed, the operations 600 move to step 603. Otherwise, if the user does not select a new visual representation, the operations 600 move to step 604.

In step 603, a new visual representation is invoked. For example, while the Summary 202 visual representation is displayed in the GUI 100, the user selects the Details button in the input control 208. The controller 514A in the backend processing module 512 generates the Details 302 visual representation by accessing the table 516A.

In step 604, a decision of whether to present a new object is made. If the user makes an input selecting a new object to be presented, the operations 600 proceed to step 605. Otherwise, if the user does not select a new object, the operations 600 proceed to step 606.

In step 605, the new object is presented using the current visual representation. For example, in FIG. 3 the user makes an input in the input control 210A initiating the presentation in the Details 302 visual representation of the next object from the list 106. In FIG. 4, the controller 514A in the backend processing module 512 retrieves the object 508A from the repository 510 and presents it to the user in the Details 302 visual representation.

In step 606 the operations 600 may terminate, such as by a terminate command input received from the user. If the operations 600 do not terminate they return to step 602.

Figure 7:
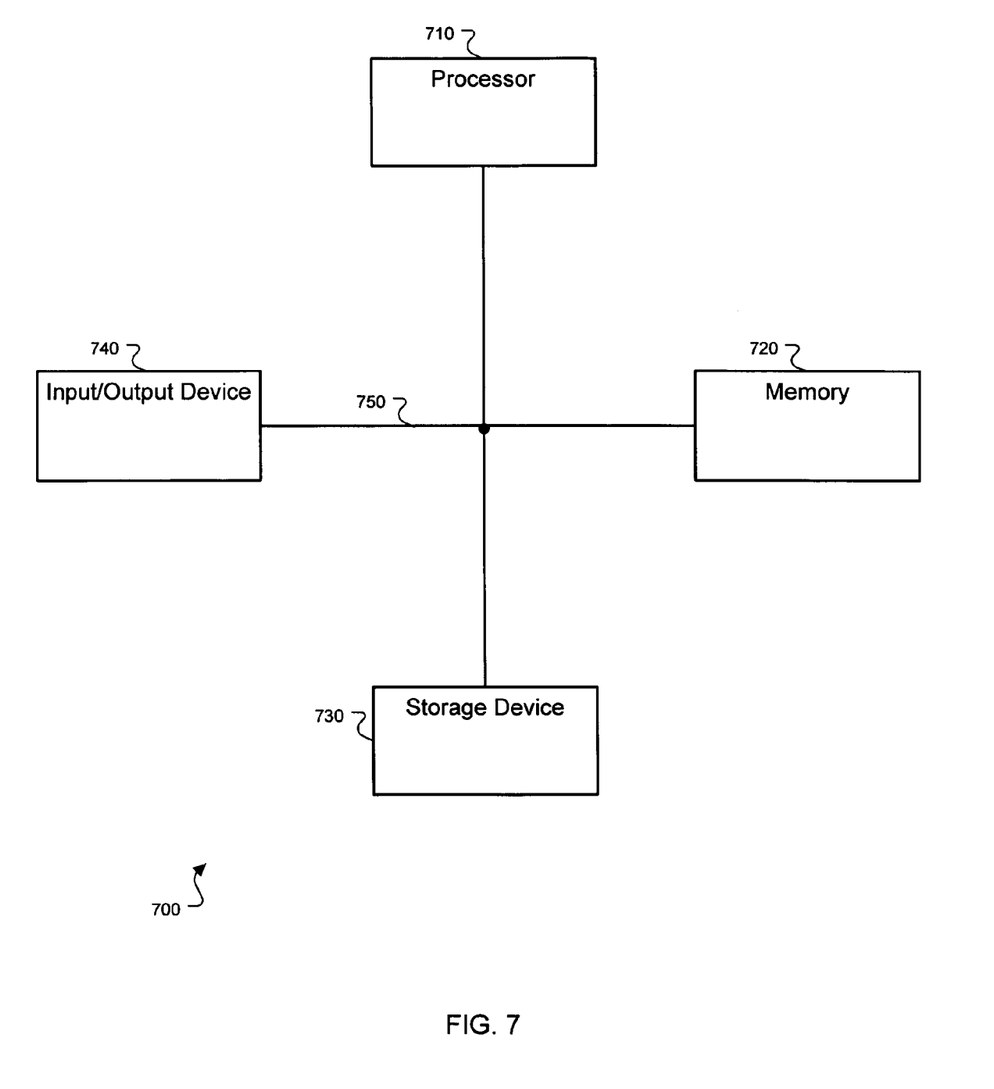
FIG. 7 is a block diagram of a general computer system.

FIG. 7 is a block diagram of a computer system 700 that can be used in the operations described above, according to one embodiment. For example, the system 700 may be included in either or all of the computer device 502, the data source system 504, and the data warehouse 506.

The system 700 includes a processor 710, a memory 720, a storage device 730, and an input/output device 740. Each of the components 710, 720, 730, and 740 are interconnected using a system bus 750. The processor 710 is capable of processing instructions for execution within the system 700. In one embodiment, the processor 710 is a single-threaded processor. In another embodiment, the processor 710 is a multi-threaded processor. The processor 710 is capable of processing instructions stored in the memory 720 or on the storage device 730 to display graphical information for a user interface on the input/output device 740.

The memory 720 stores information within the system 700. In one embodiment, the memory 720 is a computer-readable medium. In one embodiment, the memory 720 is a volatile memory unit. In another embodiment, the memory 720 is a non-volatile memory unit.

The storage device 730 is capable of providing mass storage for the system 700. In one embodiment, the storage device 730 is a computer-readable medium. In various different embodiments, the storage device 730 may be a floppy disk device, a hard disk device, an optical disk device, or a tape device.

The input/output device 740 provides input/output operations for the system 700. In one embodiment, the input/output device 740 includes a keyboard and/or pointing device. In one embodiment, the input/output device 740 includes a display unit for displaying graphical user interfaces.

The invention can be implemented in digital electronic circuitry, or in computer hardware, firmware, software, or in combinations of them. Apparatus of the invention can be implemented in a computer program product tangibly embodied in an information carrier, e.g., in a machine-readable storage device or in a propagated signal, for execution by a programmable processor; and method steps of the invention can be performed by a programmable processor executing a program of instructions to perform functions of the invention by operating on input data and generating output. The invention can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the invention can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The invention can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

A number of embodiments of the invention have been described. Nevertheless, it will be understood that various modifications may be made without departing from the spirit and scope of the invention. Accordingly, other embodiments are within the scope of the following claims.

What is claimed is:

1. A computer program product tangibly embodied in a computer-readable medium, the computer program product comprising instructions that, when executed, generate on a display device a graphical user interface (GUI) for presenting representations of selected objects in a computer system, the GUI comprising:

an object presentation area presenting one object selected from a collection of objects, the selected object being presented using a selected visual representation selected from at least first and second visual representations, wherein the first and second visual representations are initiated using different initiation techniques in the computer system, the first visual representation being a read-only visual representation in which a user cannot edit object data displayed in the read-only visual representation, the first visual representation generated using a table-based process in a backend of the computer system, the table-based process including a controller that is configured to generate the first visual representation, and the second visual representation being a user-editable representation that is generated using a script-based process that remotely calls the backend of the computer system, wherein (i) the collection of objects comprises a list of objects resulting from a search performed in the computer system, (ii) the list of objects is presented in a search result presentation area, (iii) each of the objects in the list of objects resulting from the search has a first selection control for causing the object presentation area to present the one selected object in the object presentation area;

a first input control for causing the object presentation area to present the one selected object using another visual representation instead of the selected visual representation, the other visual representation being selected from the at least first and second visual representations; and a second input control for causing the object presentation area to present another one object selected from the collection of objects instead of the selected object, wherein the other object will be presented using any visual configuration that is currently used in presenting the selected object, the second input control including (i) a first button causing a previous one object in the list to replace a current one object for display in the object presentation area using the selected visual representation, and (ii) a second button causing a next one object in the list to replace a current one object for display in the object presentation area using the selected visual representation.

2. The computer program product of claim 1, wherein the first and second input controls are located in an object header area that is displayed in the GUI in association with the object presentation area when any of the collection of objects is presented, and wherein the object header area remains essentially unchanged when changing between the at least first and second visual representations.

3. The computer program product of claim 1, wherein upon a user activating the first input control to instead have the selected object presented using the other visual representation, an identity of the selected object is provided to the other visual representation.

4. The computer program product of claim 1, wherein upon a user activating the second input control to instead have the other object presented in the GUI, an identity of the other object is provided to the visual configuration that is currently used in presenting the selected object.

5. The computer program product of claim 1, wherein upon a user activating the second input control, there is generated in the computer system a) a first event for initiating the first visual representation to present the other object, and b) a second event for initiating the second visual representation to present the other object, and wherein one of the first and second events is automatically ignored depending on the visual configuration that is currently used in presenting the selected object.

6. The computer program product of claim 1, wherein the second visual representation includes information obtained from a data warehouse system, wherein the data warehouse system obtained the information from the backend.

7. The computer program product of claim 1, wherein the computer system comprises an application program configured for managing the collection of objects, and wherein the application program specifies at least the first visual representation to be available for the collection of objects.

8. The computer program product of claim 1, wherein the first visual representation allows editing of any of the collection of objects and wherein the second visual representation does not allow editing of any of the collection of objects.

9. The computer program product of claim 1, wherein the collection of objects comprises a list resulting from a search performed in the computer system, and wherein a user can individually select any of the collection of objects for manipulation.

10. The computer program product of claim 9, wherein the GUI further comprises a selection control displayed in association with the first and second input controls, the selection control indicating whether a currently presented object is currently selected.

11. The computer program product of claim 1, wherein each of the objects in the list includes a second selection control checkbox for identifying more than one object in the group upon which a mass assignment operates, a user-editing of a field that is displayed in a selected visual representation for the one selected object where the field is contained in all objects identified by the second selection control checkbox results in editing the field for all the objects identified by the second selection control checkbox.

12. A computer system comprising:
a computer-readable medium storing a collection of objects;
a display device for presenting one object selected from the collection of objects using a selected visual representation selected from at least first and second visual representations, wherein the first and second visual representations are initiated using different initiation techniques in the computer system, the first visual representation being a read-only visual representation in which a user cannot edit object data displayed in the read-only visual representation, the first visual representation generated using a table-based process in a backend of the computer system, the table-based process including a controller that is configured to generate the first visual representation, the second visual representation being a user-editable representation that is generated using a script-based process that remotely calls the backend of the computer system, wherein (i) the collection of objects comprises a list of objects resulting from a search performed in the computer system, (ii) the list of objects is presented in a search result presentation area, (iii) each of the objects in the list of objects resulting from the search has a first selection control for causing the object presentation area to present the one selected object in the object presentation area; and
an input device comprising:
a first input control for causing the display device to present the one selected object using another visual representation instead of the selected visual representation, the other visual representation being selected from the at least first and second visual representations; and
a second input control for causing the display device to present another one object selected from the collection of objects instead of the selected object, wherein the other object will be presented using any visual configuration that is currently used in presenting the selected object, the second input control including (i) a first button causing a previous one object in the list to replace a current one object for display in the object presentation area using the selected visual representation, and (ii) a second button causing a next one object in the list to replace a current one object for display in the object presentation area using the selected visual representation.

13. The computer system of claim 12, wherein the second visual representation includes information obtained from a data warehouse system, wherein the data warehouse system obtained the information from the backend.

14. The computer system of claim 12, wherein the computer system comprises an application program configured for managing the collection of objects, and wherein the application program specifies at least the first visual representation to be available for the collection of objects.

15. A method of presenting representations of selected objects in a computer system, the method comprising:
presenting one object selected from a collection of objects, the selected object being presented using a selected visual representation selected from at least first and second visual representations, wherein the first and second visual representations are initiated using different initiation techniques in the computer system, the first visual representation being a read-only visual representation in which a user cannot edit object data displayed in the read-only visual representation, the first visual representation generated using a table-based process in a backend of the computer system, the table-based process including a controller that is configured to generate the first visual representation, and the second visual representation being a user-editable representation that is generated using a script-based process that remotely calls the backend of the computer system, wherein (i) the collection of objects comprises a list of objects resulting from a search performed in the computer system, (ii) the list of objects is presented in a search result presentation area, (iii) each of the objects in the list of objects resulting from the search has a first selection control for causing the object presentation area to present the one selected object in the object presentation area;

presenting, in response to receiving a first input, the one selected object using another visual representation instead of the selected visual representation, the other visual representation being selected from the at least first and second visual representations; and presenting, in response to receiving a second input, another one object selected from the collection of objects instead of the selected object, wherein the other object will be presented using any visual configuration that is currently used in presenting the selected object, the second input control including (i) a first button causing a previous one object in the list to replace a current one object for display in the object presentation area using the selected visual representation, and (ii) a second button causing a next one object in the list to replace a current one object for display in the object presentation area using the selected visual representation.

* * * * *

UNITED STATES PATENT AND TRADEMARK OFFICE
CERTIFICATE OF CORRECTION

PATENT NO. : 7,647,558 B2
APPLICATION NO. : 11/246924
DATED : January 12, 2010
INVENTOR(S) : Ucar et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 610 days.

Signed and Sealed this

Sixteenth Day of November, 2010

David J. Kappos
*Director of the United States Patent and Trademark Office*